United States Patent
Chang et al.

(10) Patent No.: US 9,330,093 B1
(45) Date of Patent: May 3, 2016

(54) METHODS AND SYSTEMS FOR IDENTIFYING USER INPUT DATA FOR MATCHING CONTENT TO USER INTERESTS

(75) Inventors: Di-Fa Chang, Cupertino, CA (US); Rebecca Illowsky, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 917 days.

(21) Appl. No.: 13/565,194

(22) Filed: Aug. 2, 2012

(51) Int. Cl.
- *G06F 17/30* (2006.01)
- *G06F 3/00* (2006.01)
- *E06B 9/15* (2006.01)

(52) U.S. Cl.
CPC .. *G06F 17/30* (2013.01); *E06B 9/15* (2013.01)

(58) Field of Classification Search
CPC .................. G06F 17/30864; G06F 17/30861
USPC ....................................................... 715/234
See application file for complete search history.

(56) References Cited

U.S. PATENT DOCUMENTS

| | | | | |
|---|---|---|---|---|
| 7,200,677 | B1 * | 4/2007 | Allen ................. | G06F 17/30887 707/E17.108 |
| 7,810,035 | B2 * | 10/2010 | Dominowska .... | G06F 17/30873 715/206 |
| 7,827,254 | B1 * | 11/2010 | Nevill-Manning | G06F 17/30864 709/217 |
| 7,949,648 | B2 * | 5/2011 | Jacobsen ........... | G06F 17/30864 707/710 |
| 8,024,316 | B2 | 9/2011 | Garg et al. | |
| 2002/0032740 | A1 * | 3/2002 | Stern ................. | G06F 17/30864 709/206 |
| 2003/0110158 | A1 * | 6/2003 | Seals ................. | G06F 17/30864 |
| 2005/0182677 | A1 | 8/2005 | Hill | |
| 2006/0123107 | A1 * | 6/2006 | Chen ................... | G06F 17/3089 709/224 |
| 2006/0136528 | A1 * | 6/2006 | Martin .............. | G06F 17/30702 |
| 2007/0118607 | A1 * | 5/2007 | Nelissen ............. | G06Q 10/107 709/217 |
| 2007/0288434 | A1 * | 12/2007 | Cohn ..................... | G06Q 30/00 |
| 2007/0288479 | A1 * | 12/2007 | Howard ............ | G06F 17/30887 |
| 2008/0140626 | A1 * | 6/2008 | Wilson ............. | G06F 17/30864 |
| 2009/0024718 | A1 * | 1/2009 | Anagnostopoulos .. | G06Q 30/02 709/218 |
| 2009/0055267 | A1 | 2/2009 | Roker | |
| 2009/0063538 | A1 * | 3/2009 | Chitrapura ........ | G06F 17/30887 |
| 2009/0192986 | A1 * | 7/2009 | Garg ..................... | G06Q 30/02 |
| 2009/0204638 | A1 * | 8/2009 | Hollier ................ | G06F 17/3089 |
| 2009/0222426 | A1 * | 9/2009 | Koch ................. | G06F 17/30864 |
| 2009/0240670 | A1 * | 9/2009 | Tiyyagura ............... | G06F 17/30 |
| 2009/0327237 | A1 * | 12/2009 | Zhang ............... | G06F 17/30864 |
| 2011/0177799 | A1 | 7/2011 | Ramer et al. | |
| 2011/0246457 | A1 * | 10/2011 | Dong ...................... | G06Q 10/06 707/725 |
| 2011/0258049 | A1 | 10/2011 | Ramer et al. | |
| 2011/0307432 | A1 * | 12/2011 | Yao ................... | G06F 17/30864 706/25 |
| 2012/0054598 | A1 * | 3/2012 | Lin .................... | G06F 17/30905 715/235 |
| 2012/0144291 | A1 * | 6/2012 | Chang ............... | G06F 17/30867 715/234 |
| 2012/0240236 | A1 * | 9/2012 | Wyatt .................... | G06F 21/564 726/25 |
| 2013/0254181 | A1 * | 9/2013 | Balassanian ...... | G06F 17/30864 707/709 |
| 2013/0346387 | A1 * | 12/2013 | Ayoub .............. | G06F 17/30867 707/709 |

\* cited by examiner

*Primary Examiner* — Scott Baderman
*Assistant Examiner* — Mario M Velez-Lopez
(74) *Attorney, Agent, or Firm* — Fish & Richardson P.C.

(57) ABSTRACT

A method of managing content includes analyzing a plurality of referring uniform resource locators (URLs); extracting, from each of the referring URLs, website data and a parameter having a parameter value; generating website parameter pairs based on the website data and the parameters of the referring URLs; determining a diversity metric, for each website parameter pair, based on variety of parameter values of the website parameter pair; selecting a website parameter pair having a diversity metric exceeding a determined threshold; and generating a template for parsing a referring URL of the selected website parameter pair.

17 Claims, 5 Drawing Sheets

Query Information http://www.google.com/search?hl=en&q=carbonated+berry+lemonade  } 304

METHODS AND SYSTEMS FOR IDENTIFYING USER INPUT DATA FOR MATCHING CONTENT TO USER INTERESTS

TECHNICAL FIELD

The disclosure relates generally to content providing systems and methods, and, in particular, to systems and methods for matching content to user interests.

BACKGROUND

The Internet provides access to a wide variety of content. The ability to search that content and provide intelligent search results to a user continues to be a challenge. Moreover, providing content related to services or items that the user would like to purchase can be beneficial to both the users and the content providers.

Content providers decide which content is displayed using various content management tools. These tools also allow a content provider to track the performance of various content items or content campaigns. The parameters used to determine when to display a particular content item can also be changed using content management tools.

SUMMARY

A method of managing content includes, but is not limited to, any one or combination of: (i) analyzing a plurality of referring uniform resource locators (URLs); (ii) extracting, from each of the referring URLs, website data and a parameter having a parameter value; (iii) generating website parameter pairs based on the website data and the parameters of the referring URLs; (iv) determining a diversity metric, for each website parameter pair, based on variety of parameter values of the website parameter pair; (v) selecting a website parameter pair having a diversity metric exceeding a determined threshold; and (vi) generating a template for parsing a referring URL having website data corresponding to the selected website parameter pair.

In various implementations, the method further includes: receiving a content item request for a page, the content item request including a referring URL having website data corresponding to the selected website parameter pair; parsing a parameter value from the referring URL of the content item request based on the template for the selected website parameter pair; selecting a content item based on the parameter value parsed from the referring URL of the content item request; and providing the content item for display on the page.

In some implementations, the parsing includes: selecting a template for parsing the referring URL of the content item request; and parsing a parameter value from the referring URL of the content item request based on the selected template.

In some implementations, the method further includes storing the template for the selected website parameter pair on a server.

In further implementations, the parsing includes: retrieving the template; and parsing a parameter value from the referring URL of the content item request based on the retrieved template.

In various implementations, the content item comprises an advertisement.

In various implementations, the parameter value corresponds to at least one keyword.

In various implementations, the parameter value corresponds to a user input.

In various implementations, the referring URL of the content item request for the page corresponds to a URL of a previously visited page.

In some implementations, the referring URL of the content item request for the page corresponds to a user input to the previously visited page.

An apparatus for managing content includes, a processor configured for but not limited to any one or combination of, (i) analyzing a plurality of referring uniform resource locators (URLs); (ii) extracting, from each of the referring URLs, website data and a parameter having a parameter value; (iii) generating website parameter pairs based on the website data and the parameters of the referring URLs; (iv) determining a diversity metric, for each website parameter pair, based on variety of parameter values of the website parameter pair; (v) selecting a website parameter pair having a diversity metric exceeding a determined threshold; and (vi) generating a template for parsing a referring URL having website data corresponding to the selected website parameter pair.

In various implementations, the content item comprises an advertisement.

In various implementations, the parameter value corresponds to at least one keyword.

In various implementations, the parameter value corresponds to a user input.

In various implementations, the referring URL of the content item request for the page corresponds to a URL of a previously visited page.

A computer program product for managing content, the computer program product including a computer-readable storage medium having code for (but not limited to any one or combination of): (i) analyzing a plurality of referring uniform resource locators (URLs); (ii) extracting, from each of the referring URLs, website data and a parameter having a parameter value; (iii) generating website parameter pairs based on the website data and the parameters of the referring URLs; (iv) determining a diversity metric, for each website parameter pair, based on variety of parameter values of the website parameter pair; (v) selecting a website parameter pair having a diversity metric exceeding a determined threshold; and (vi) generating a template for parsing a referring URL having website data corresponding to the selected website parameter pair.

In various implementations, the content item comprises an advertisement.

In various implementations, the parameter value corresponds to a user input.

In various implementations, the referring URL of the content item request for the page corresponds to a URL of a previously visited page.

BRIEF DESCRIPTION OF THE DRAWINGS

FIG. 3 is an illustrative example of query information according to various embodiments of the disclosure.

DETAILED DESCRIPTION

User input data is a very strong signal for content matching. For instance, a search query that a user types in a search box on a web page represents what currently interests the user. Content item requests generally include the URL of the page that the user is currently browsing and the referring URL(s) that the user previously visited. Many of these referring URLs have user input data embedded. For example, the referring URL "http://www.foo.com/search?q=cars" contains a user search query "cars." Various websites, however, use different parameters or sub-components in the URL path to specify user input data (the search query).

According to various implementations, a system is configured to analyze referring URLs, for instance, to detect CGI parameters (or the like) with a value with great diversity across URLs. The system may parse the URL and aggregate parameter values for each (site, parameter) pair. For example, for the (site, parameter) pair (foo.com, q), parameter values such as "cars," "trucks," and "motorcycles" may be aggregated. If the parameter represents a search query, the values of the parameters are likely to be different for various URLs for a given site. Thus, as variety of parameter values for a site increases, likelihood that a given parameter represents a search query increases.

After aggregation, the system assigns a diversity metric for each (site, parameter) pair based on the variety of the parameter values of the (site, parameter) pair. For instance, the pair (foo.com, q) which has values, for example three different or unique values, such as "cars," "motorcycles," and "trucks," has a greater diversity metric than the pair (site2.com, input), which has, for example one unique value (e.g., "female").

The diversity metrics for each (site, parameter) pair may be used to determine (learn) a threshold that may be used to select parameters with sufficiently high diversity metrics. For instance, for a given (site, parameter) pair, if the diversity metric exceeds the threshold, then the parameter likely represents a search query, whereas if the diversity metric does not exceed the threshold, then the parameter likely does not represent a search query. Accordingly, for sites having sufficiently high diversity metrics (e.g., exceeding a predetermined threshold), templates for parsing referring URLs for such sites may be generated. As such, when a user subsequently visits an analyzed site with a parameter that has been determined to represent a search query, a parameter value may be obtained from a referring URL for the analyzed site and used to select content items for providing to the user.

Figure 1:
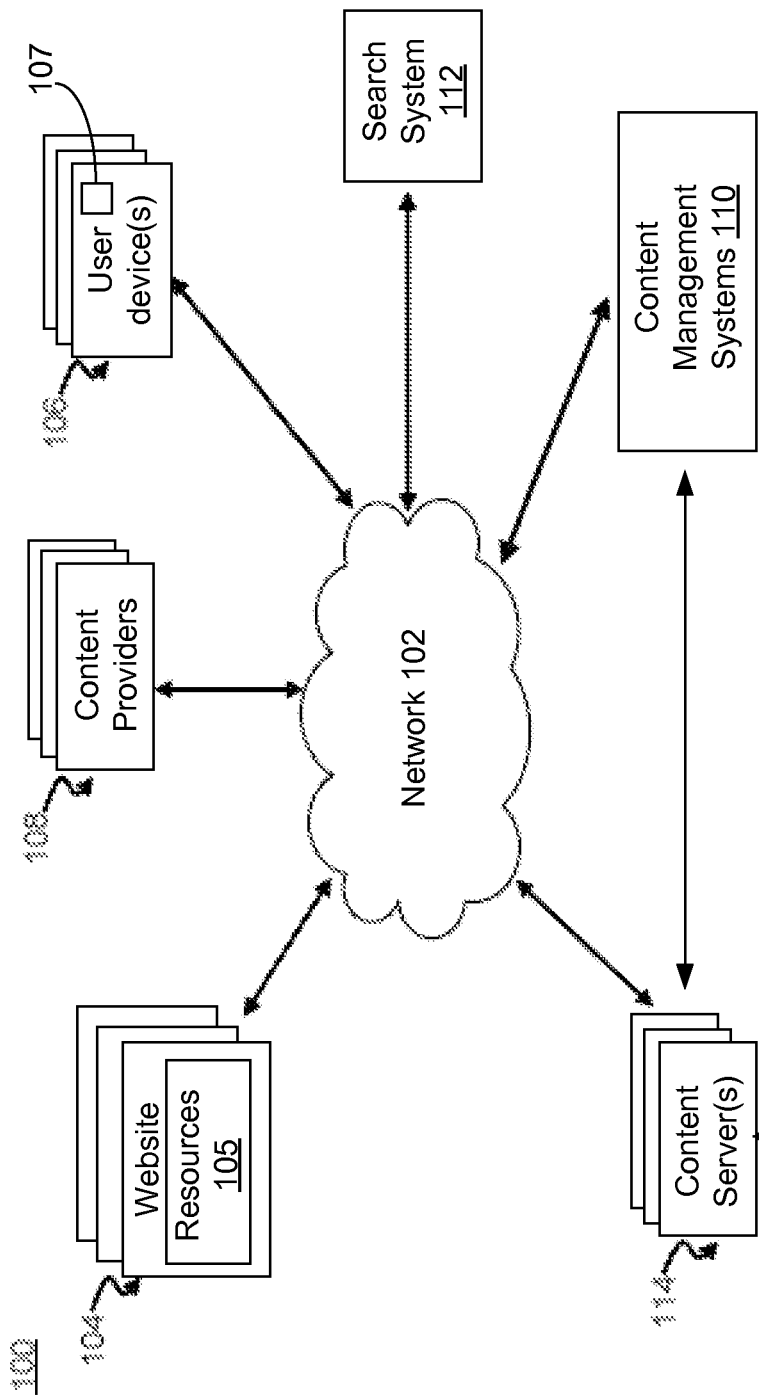
FIG. 1 is a block diagram of an environment in which a content management system manages content-providing services according to various implementations of the disclosure.

FIG. 1 is a block diagram of an environment in which a content management system manages content-providing services. The environment 100 includes a network 102, such as a local area network (LAN), a wide area network (WAN), the Internet, or a combination thereof. The network 102 connects websites 104, user devices 106, content providers 108, and a content management system 110. The environment 100 may include many thousands of websites 104, user devices 106, and content providers 108.

The website 104 is one or more resources 105 associated with a domain name and hosted by one or more servers. For instance, a website may be a collection of web pages formatted in hypertext markup language (HTML) that can contain text, images, multimedia content, and programming elements, such as scripts.

The resource 105 is any data that can be provided over the network 102. The resource 105 is identified by a resource address that is associated with the resource 105, such as a uniform resource locator (URL). The resource 105 may include web pages, word processing documents, portable document format (PDF) documents, images, video, programming elements, interactive content, feed sources, and/or any other type of content. The resource 105 can include content, such as words, phrases, images, and sounds, which may include embedded information (such as meta-information in hyperlinks) and/or embedded instructions (such as JavaScript™ scripts).

The user device 106 is an electronic device that is controllable by a user and is capable of requesting and receiving resources (e.g., 105) over the network 102. User devices 106 may include, but are not limited to, personal computers, mobile communication devices, and other devices that can send and receive data over the network 102. The user device 106 typically includes a user application, such as a web browser 107, to facilitate the sending and receiving of data over the network 102. The user device 106 may also be referred to as a computing device.

The user device 106 can request the resources 105 from the website 104 (or other resource server). In turn, data representing the resource 105 can be provided to the user device 106 for presentation by the user device 106. The data representing the resource 105 can include data specifying a portion of the resource 105 or a portion of a user display (e.g., a presentation location of a pop-up window or in a slot of a web page) in which a content item or other sponsored content item can be presented. These specified portions of the resource 105 or user display may be referred to as content slots. In some implementations, "content" or "content items" may refer to advertisements, and "content item" may refer to an advertisement. In such implementations, for instance, "content provider" may refer to advertisers or the like.

To facilitate searching of the vast number of resources 105 accessible over the network 102, the environment 100 can include a search system 112 that identifies the resources 105 by crawling and indexing the resources provided on the websites 104. Data about the resources can be indexed based on the resource with which the data is associated. The indexed and, optionally, cached copies of the resources are stored in a search index (not shown).

The user device 106 can submit search queries (e.g., via the browser 107) to the search system 112 over the network 102. In response, the search system 112 accesses the search index to identify resources that are relevant to the search query. In some implementations, a search query includes one or more keywords. The search system 112 identifies the relevant resources 105 in the form of search results and returns the search results to the user device 106 in search results pages. A search result is data generated by the search system 112 that identifies the resources 105 that are responsive to a particular search query, and includes a link to the resource 105. For instance, a search result can include a web page title, a snippet of text or a portion of an image extracted from the web page, a rendering of the resource, and the URL of the web page. Search results pages can also include one or more content slots in which one or more content items can be presented.

A search result page can be sent with a request from the search system 112 for the web browser 107 of the user device 106 to set an HTTP (HyperText Transfer Protocol) cookie. A cookie can represent, for example, a particular user device 106 and a particular web browser 107. For example, the search system 112 includes a server that replies to the query by sending the search results page in an HTTP response. This HTTP response includes instructions (e.g., a set cookie instruction) that cause the browser 107 to store a cookie for the site hosted by the server or for the domain of the server. If the browser 107 supports cookies and cookies are enabled, every subsequent page request to the same server or a server within the domain of the server will include the cookie. The cookie can store a variety of data, including a unique or semi-unique identifier. The unique or semi-unique identifiers are anonymized and are not connected with user names. Because HTTP is a stateless protocol, the use of cookies allows an external service, such as the search system 112 or other system, to follow particular actions and status of a user over multiple sessions. A user may, at any time, opt out of allowing user actions to be followed, for example, by disabling cookies in the browser 107 settings. According to various implementations, the search system 112 does not follow user identifying information. In some implementations, a user may be required to opt in to enable user actions to be followed.

When a resource 105 is requested by the user device 106, the content management system 110 receives a request for a content (one or more content items) to be provided with the resource 105. The request for content can include characteristics of the content slots that are defined for the requested resource 105 or search results page and can be provided to the content management system 110. For example, a reference (e.g., URL) to the resource 105 for which the content slot is defined, a size of the content slot, a position of the content slot within the resources, and/or media types that are available for presentation in the content slot can be provided to the content management system 110. Similarly, keywords associated with a requested resource ("resource keywords") or a search query for which search results are requested can also be provided to the content management system 110 to facilitate identification of content items that are relevant to the resource 105 or search query.

Using data included in the request for content, the content management system 110 can select one or more content items that are eligible to be provided in response to the request ("eligible content item(s)" or "candidate content item(s)"). For example, the eligible content items may include content items having characteristics matching the characteristics of content slots and that are identified as relevant to specified resource keywords or search queries. In some implementations, content items having one or more keywords that match the resource keywords or the search query are selected as the eligible content items by the content management system 110.

The content management system 110 may select an eligible content item for each content slot of the resource 105. The resource 105 or search results page may be received by the user device 106 for presentation to the user, for instance on the browser 107. In some implementations, the selected content item may be delivered to the user device 106 via one or more content servers 114.

The content providers 108 can submit, to the content management system 110, campaign parameters (e.g., matching keywords and corresponding bids) that are used to control distribution of content items. The content providers 108 can access the content management system 110 to monitor performance of the content items that are distributed using the campaign parameters. For example, a content provider 108 can access a campaign performance report that provides a number of impressions (e.g., presentations), selections (e.g., clicks), and conversions (e.g., converting impressions into desired actions) that have been identified for the content items.

The campaign performance report can also provide a total cost, a cost-per-click, and other cost measures for the content items over a specified period. For example, a content provider 108 may access a performance report that specifies that content items distributed using the phrase match keyword "hockey" have received 1,000 impressions (e.g., have been presented 1,000 times), have been selected (e.g., clicked) 20 times, and have been credited with 5 conversions. Thus, the phrase match keyword "hockey" can be attributed with 1,000 impressions, 20 clicks, and 5 conversions.

One example of online content providing offers pay-per-click (PPC) content providing, cost-per-thousand (CPM) content providing, and site-specific content providing for text, banner, rich-media content, and/or the like. The program may include local, national, and international distribution. The text content can be short, for example comprising one headline of 25 characters and two additional text lines of 35 characters each. Image content can be one of several different Interactive Advertising Bureau (IAB) standard sizes.

In some implementations in which the content-providing campaign implements PPC content providing, content providers 108 may select words that should trigger their content items and the maximum amount they will pay per click. When a user searches on a search engine, content items for relevant words may appear as "sponsored links" on the (right or left) side of the page, and sometimes above or below the main search results. In some implementations, content items can appear on any portion of a page. The ordering of the paid-for listings may depend on other content providers' bids (PPC) and factors such as the "quality score" of all content items shown for a given search. In some implementations, the content management system 110 may determine the factors based on historical click-through rates (CTR), predicted click-through rates (pCTR), relevance of a content provider's content item text and keywords, a content provider's account history, and other relevance factors. The quality score may also be used to set the minimum bids for a content provider's keywords. The minimum bid may take into consideration the quality of the landing page as well, which may include the relevancy and originality of content, navigability, transparency into the nature of the business, and/or the like.

In some implementations, a "user" may refer to any company, organization, partnership, individual, agent, or entity that is involved in online content providing. Thus, in some implementations "user" and "content provider" can be used interchangeably. Keyword coverage refers to the number of searches done by "search engine users" that result in a paid result—a content item—being displayed. For example, 50% of searches conducted on a search engine may result in a paid content item being displayed. Out of that, 1% of the searches may result in a specific content provider's URL being provided. In general, the online content provider's goal is to have its content item(s) appear on a display page after as many relevant searches as possible. One way a content provider 108 can extend their keyword coverage is by purchasing additional keywords, thus increasing the likelihood that their content item(s) will appear on displays of search results. The number of paid results per keyword can vary, and where a URL ranks among the paid results may depend on several factors, including relevancy and the keyword purchase price.

There are several ways a content provider 108 may select keywords to purchase. For example, a content provider 108 may select a group of keywords that define the products, services, or content the content provider 108 offers on its web page. The content provider 108 may try to expand its keyword selection by selecting all synonyms, or by selecting keywords that are related, in some manner, to the products, services, or content the content provider 108 offers on its web page. The content provider 108 may try to optimize its selection of keywords by monitoring how effective each keyword is. For example, the content provider 108 may use a tool that records the number of times a purchased keyword is entered into a search engine and the number of times that results in the content provider's web page being viewed.

Figure 2:
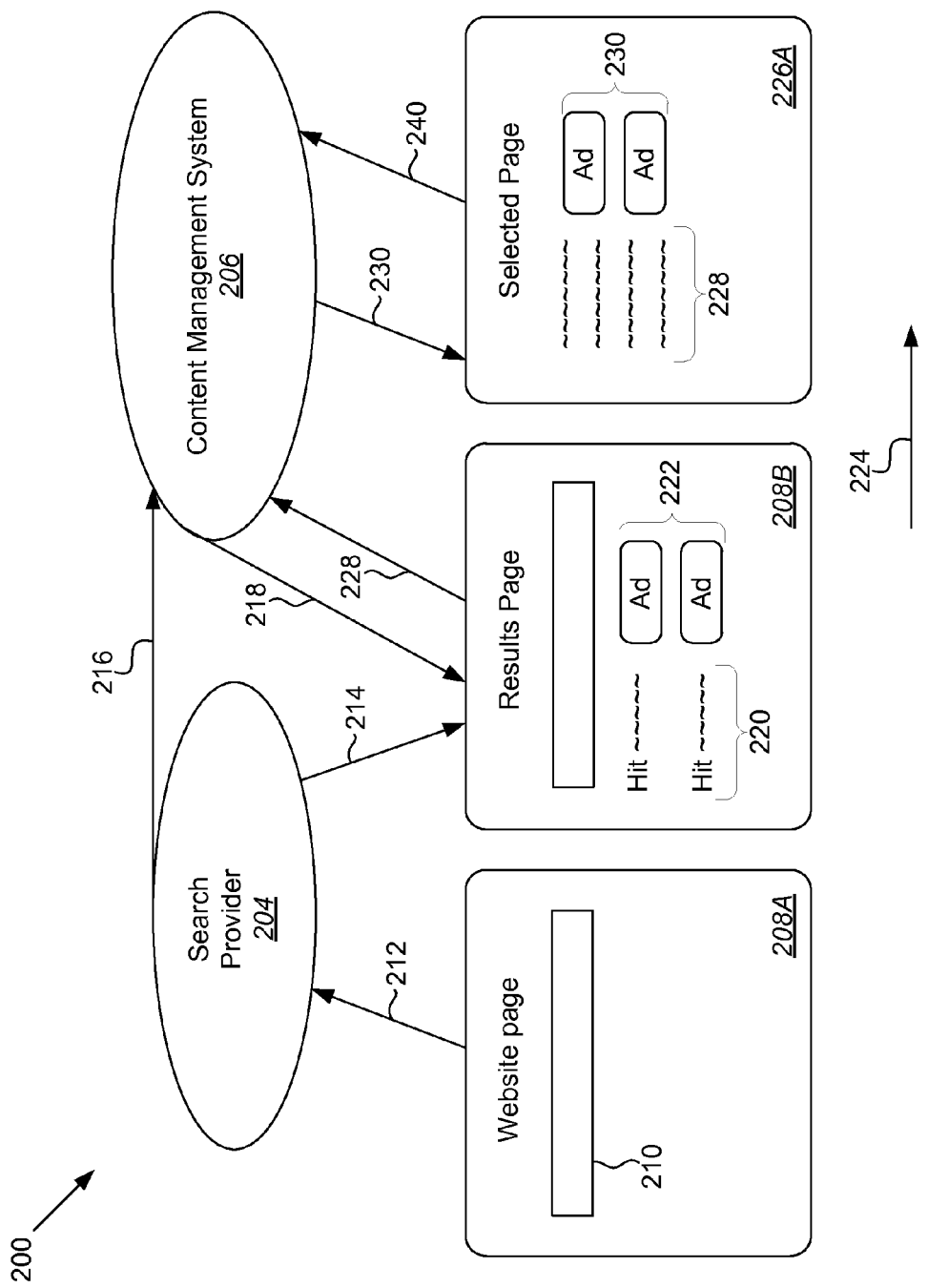
FIG. 2 is block diagram of a system for managing content according to various embodiments of the disclosure.

With reference to FIGS. 1 and 2, a search provider or search engine 204 (which may correspond, for example, to the search system 112) may be provided on a page 208A (which may correspond to the website 104) for display on the user device 106 where the user can formulate a search, and may also provide a results page 208B for display on the user device 106 that presents corresponding search results. That is, the user can enter one or more portions of information using an input control 210 (e.g., the user enters keyword(s) in a search field). The results page 208A provides that the entered query is forwarded to the search provider 204 as indicated by arrow 212. In some implementations, the page 208A constitutes the outward interface of a search engine comprised in the search provider 204.

The search provider 204 receives the forwarded query 212 and performs a search according to its preprogrammed search routine(s). For example, the search provider 204 can compare one or more search terms against an index and then identify any resource whose index entry matches the search term(s). Such results can be forwarded to the user device 106 for display in the results page 208B as indicated by arrow 214.

The search provider 204 can facilitate that additional content (e.g., advertisements) be included in the results page 208B. In some implementations, the search provider 204 can directly provide the additional content to the user device 106. For example, when additional content is to be included, the search provider 204 can select the additional content and include it with the search results.

In other implementations, one or more other components can be used to provide the additional content. Here, the system 200 uses a content management system 206 (which may correspond to the content management system 110) to provide content for one or more pages. For instance, the content may be selected based on some aspect about the performed search, based on the user based on the user device 106, and/or the like. That is, in at least one implementation, the content is to be matched, in some sense, to the screen where it is to appear. In some implementations, the content is matched based on one or more historical searches that have been performed by a user and may have little or no relation to the screen where it is to appear.

To facilitate such matching, the search provider 204 can forward information about the search, the user device 106, and/or the user to the content management system 206. The forwarding is here indicated by an arrow 216. In some implementations, the provided information can include one or more search terms and/or information about the user or the access device 202. The content management system 206 uses the received information to select the additional content according to its preprogrammed selection routine(s). For example, the content management server 206 can make a selection in a library of content based on matches with words received from the search provider 204. The content management system 206 can provide the additional content for display in the results page 208B either through the search provider 204, or by another communication to the user device 106, to name a few examples, as indicated by an arrow 218.

The results page 208B can be displayed with content items that include search result contents 220 (e.g., one or more hits from a keyword search) and additional content 222 (e.g., one or more advertisements selected based on some criterion or criteria). In some implementations, the additional content can be selected based on available information, such as the submitted query and/or any available information about the user and/or the user device 106. Some or all of the content 220, 222 can be presented in form of navigation features, such as hyperlinks, by which the user can navigate from the page 208B to an associated resource where more content is available.

Here, the user may initiate such a navigation using one of the navigation features, as indicated by a navigation arrow 224. For instance, the user may choose to navigate to a selected page 226A.

For instance, the navigation 224 to the selected page 226A may have begun in the results content 220 (e.g., the user may have selected a search hit), or it may have begun in the additional content 222 (e.g., the user may have clicked on an advertisement), to name a few examples. In any event, additional content 230 can be also provided also on the selected page 226A. That is, the publisher of the selected page 226A here has provided that the selected page 226A should be published including the content 228 (e.g., articles, media, etc.) and the additional content 230 (e.g., one or more advertisements). The additional content 230 can be selected using available information about the previous search, the user device 106, the user, and/or the like.

Here, information about the results page 208B may be available in form of a referring uniform resource locator (URL). That is, when the user initiates the navigation 224, there can be provided information about the results page 208B from which the navigation originated. Such information can be received by a server for the selected page 226A, or by an intermediary entity that redirects the navigation to the intended target, by the content management system 206, and/or the like. The referring URL can include essentially the URL of the results page 208B. In some implementations, such a URL reflects the query that the user entered on the page 208A. As such, the referring URL can provide information on the query that led to the results page 208B, and this information can be used for one or more purposes. Thus, the content management system 206 can obtain information extracted from a referring URL in navigation to a page, the information reflecting a query submitted from a user device 106 to the search provider 204.

In some implementations, information from the referring URL can be used in providing additional content (e.g., an advertisement) for the selected page 226A. For example, the referring URL (or information obtained from it) can be forwarded to the content management system 206 as indicated by an arrow 228. If the received information is in a different format than necessary, the content management system 206 can reformat, translate, or otherwise manipulate the information before using it. In other implementations, such processing can be performed by another entity and the processed information can be forwarded to the content management system 206. The content management system 206 can select the additional content (e.g., choose matching content) and provide the content to the user device 106, as indicated by an arrow 230, for display in the selected page 226A.

In some implementations, information from the referring URL can be stored for future use. For instance, the content management system 206 can store query information 232 on the user device 106. The query information can include any keyword(s) entered by the user on the page 208A, to name just one example. Such terms reflect the query that the user previously submitted and they can be obtained by extracting content from the referring URL. Thus, query information can be stored on the user device 106 based on the obtained information, the query information reflecting an earlier query and configured for use in providing content for at least another page. The query information can be stored as part of at least one cookie or any other structure on the user device 106. The stored query information can be available on the user device 106 for one or more purposes, such as to reflect the user's previous search history for use in matching content for the user.

The query information (e.g., as provided in the referring URL) can be particularly reflective of the user's interests. For example, many users enter queries in search engines (e.g., 204) because they are interested in a particular product or service. Particularly, when the user later navigates to other pages or the deeper pages from the selected page 226A, such query terms from a previous search may be among the more indicative information available at that point about the user's interests. Thus, by knowing what query or queries a user has previously entered, one may be able to better match content to that particular user's interests.

With reference to FIGS. 1-3, query information 302A may include a URL 304 that can appear after a search is performed using a search provider 204 (e.g., the Google search engine available at www.google.com). Here, the URL 304 reflects that the search was based on the three key words "carbonated," "berry," and "lemonade." Accordingly, the results page (e.g., 208B) that displays hits from the query for these words can be associated with the URL 304. An entity that accesses the query information 302A can extract one or more of the words carbonated, berry, and lemonade from the URL 304 and use these words to provide content for a page to be displayed. In some implementations, the extraction can be done by parsing the URL 304 with a template associated with the search provider 204, for instance, as described (but not limited to) the disclosure.

Figure 4:
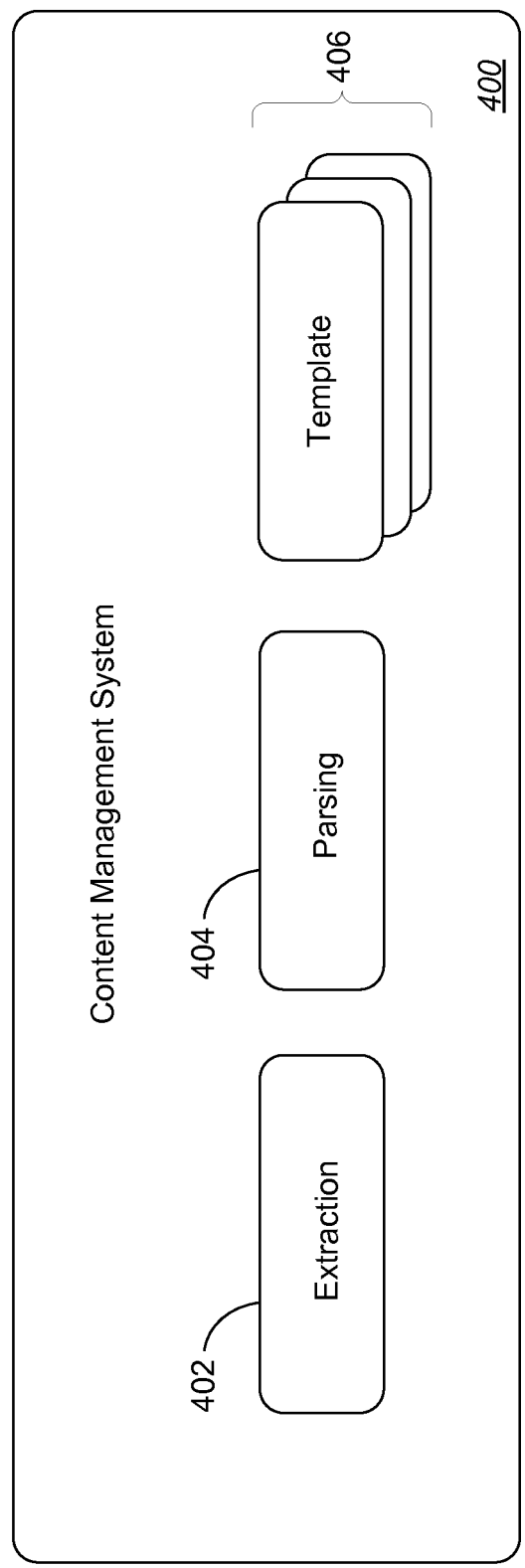
FIG. 4 is a block diagram of a content management system according to various implementations of the disclosure.
Figure 5:
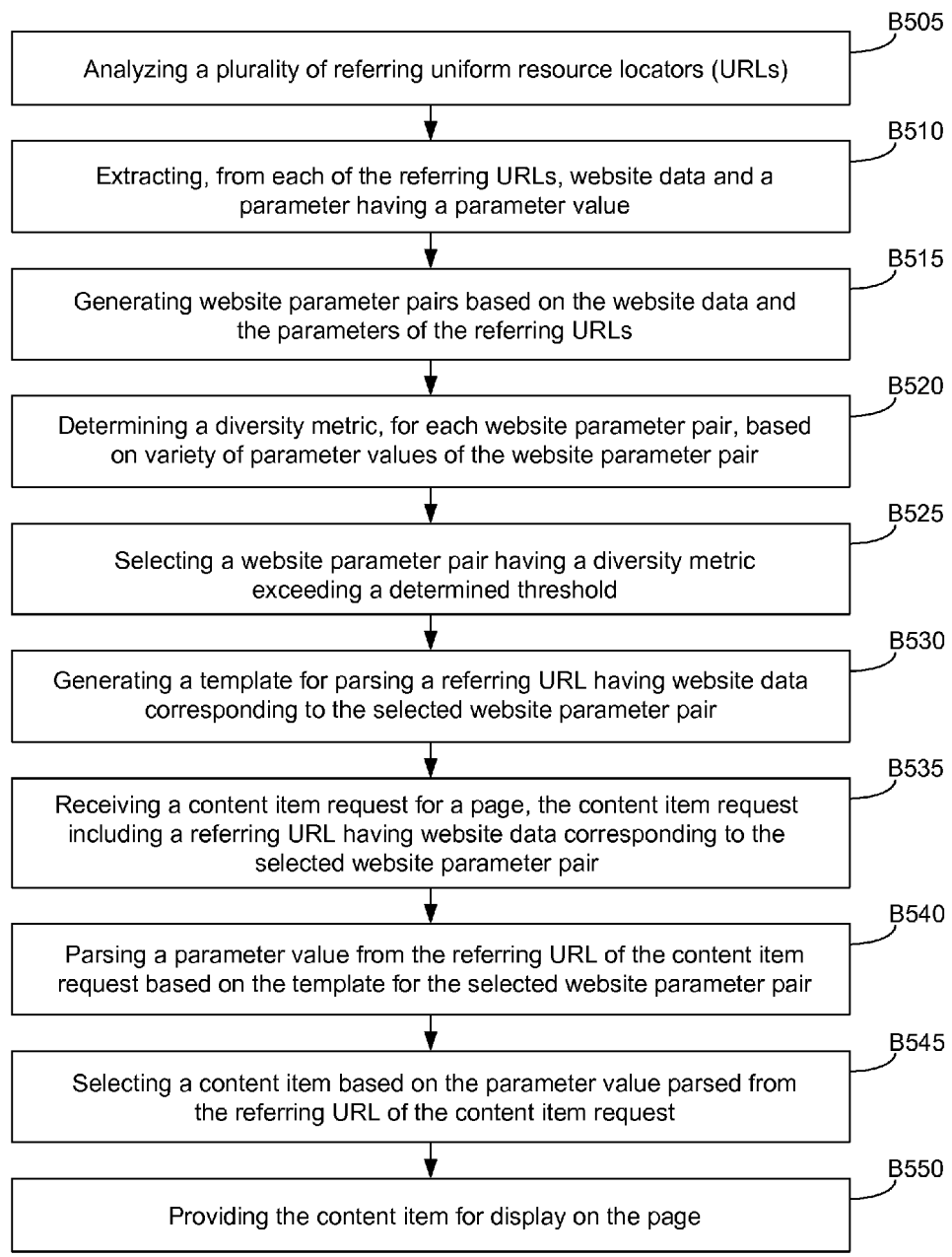
FIG. 5 is a flow chart of a method for managing content according to various implementations of the disclosure.

FIG. 4 illustrates a content management system 400. With reference to FIGS. 1-4, in some implementations, the content management system 400 can be the same as or similar to the content management system 110, 206.

The content management system 400 may include an extraction module 402 that can extract one or more aspects from a portion of query information. Extraction can be performed, for example, when the content management system 206 receives the referring URL (e.g., 304) from the results page 208B or in a content item request from the selected page 226A, the extraction module 402 can extract relevant information from the referring URL 304 and process and/or store that extracted information (e.g., one or more key words). As another example, upon accessing the query information on the user device 106, the extraction module 402 can perform the extraction on the URL 304 and then select the additional content based on the extracted information.

The content management system 400 may include a parsing module 404 that can parse a URL. For example, the referring URL 304 in the query information 302A can be parsed to obtain any or all of the key words "carbonated," "berry," and "lemonade." Any parsing technique can be used, for example by looking for the expression "q=" (or other known expression) that precedes the key terms and then taking the words or terms found in the rest of the URL 304. The parsing can remove intervening characters or other separators, such as the "+" characters, in the URL 304. In some implementations, the parsing module 404 can be included in the extraction module 402.

In some implementations, query information can be accessed using one or more templates 406. Templates can be configured to the specifics of individual search engines (e.g., 204) to help obtain information relating to corresponding searches. For example, one of the templates 406 can be configured for searches from the Google search engine, another for a search engine/provider of a first website (e.g., website1.com), another for a search engine/provider of a second website (e.g., website2.com), etc. The Google template can contain information on how to parse a URL (e.g., the URL 304) and obtain the relevant information from it (e.g., keywords: carbonated, berry, and lemonade). If the name of the website (or another recognizable characteristic) is present in the query information to be parsed, that name (or characteristic) can be used to select the proper one of the templates 406 to be used for a particular portion of query information. Accordingly, the content management system 400 can perform the extraction of information from a referring URL. Moreover, the content management system 400 can parse the referring URL for at least one keyword of the query. Finally, the referring URL can be parsed using a selected one of the templates 406, each of the multiple templates configured for parsing referring URLs from a corresponding website.

In various implementations, the content management system 400 (or other entity) may be configured to generate the templates 406 for corresponding websites by analyzing referring URLs from the websites, for instance at block B505 of method B500. The referring URLs can be analyzed to determine which parameters or components of the referring URLs include the query information. In some implementations, the content management system 400 may detect a CGI parameters or other parameters in the referring URLs that have a certain diversity for a given website. Thus, for instance, at block B510, the content management system 400 may extract, from each of the referring URLs, website data (e.g., domain or the like) and a parameter (e.g., CGI parameter) having a parameter value (e.g., value for the CGI parameter or the like).

At block B515, the content management system 400 may generate website parameter pairs based on the website data and the parameters of the referring URLs. For the referring URLs http://www.website1.com/search?q=cars
http://www.website1.com/search?q=trucks
http://www.website1.com/search?q=motorcycles
http://www.website1.com/search?q=cars
http://www.website2.com/input=male
http://www.website2.com/input=female
http://www.website3.com/test.php
http://www.website4.com/sports/ the pairs (website1.com, q), (website2.com, input), (website3.com, test.php), and (website4.com, sports) may be generated. The parameter values for each of the website parameter pairs may be aggregated. Thus, for the pair (website1.com, q), the parameter values "cars," "trucks," and "motorcycles" may be aggregated; for the pair (website2.com, input), "male" and "female"; etc.

At block B520, the content management system 400 may determine, for each website parameter pair, a diversity metric. In some implementations, the diversity metric of the website parameter pair may be defined as a number of different or unique parameter values (e.g., in total, relative to total parameter values for the website, etc.) For the referring URLs and pairs discussed, the diversity metrics for (website1.com, q) may be three, (website2.com, input) may be two, (website3.com, test.php) may be one (or zero), and (website4.com, sports) may be one (or zero).

In general, if the parameters of referring URLs from a given website (website, parameter pair) is indeed query information (e.g., such that the values of such parameters is a keyword or the like), the given website will have a higher diversity metric (e.g., a greater variety of parameter values) than for a referring URL of a website (website, parameter pair) with a relatively lower diversity metric. Accordingly, at block B525, the content management system 400 may select one or more of the website parameter pairs that have a diversity metric exceeding a determined threshold. The determined threshold may a designated value for the diversity metric (e.g., at least three). In other implementations, the determined threshold may be determined based on diversity metrics for websites that have parameters that are known to represent query information (e.g., corresponding parameter values represent keywords) and basing the determined threshold for the unknown websites (e.g., website1.com, website2.com, website3.com, website4.com) on the diversity metrics for the known websites. The diversity metrics for the known websites may be entered manually and/or determined by previously analyzing the website (e.g., via method 500). For example, if the predetermined threshold is three, the pair for website1.com may be selected, but not website2.com, website3.com, and website4.com.

At block B530, the content management system 400 may generate a template (e.g., 406) for the pair for website1.com. Accordingly, when a content item request for a page that includes a referring URL from website1.com, the referring URL may be parsed according to the template. Accordingly, in various embodiments, blocks B505-B530 may be considered a training or learning mode to determine which parameters, components, and/or the like of referring URLs may correspond to query information (e.g., keywords). As such, the generated template may be used to parse or otherwise obtain query information from referring URLs to allow the query information to be used to selected content items (e.g., blocks B535-B550).

At block B535, the content management system 400 may receive a content item request for a page (e.g., 226A). The content item request may include a referring URL. At block B540, the content management system 500 may parse a parameter value from the referring URL of the content item request based on the template for the selected pair. For instance, the content management system 400 may determine from the referring URL which template to select. For example, if the referring URL is http://www.website1.com/search?q=sports+cars, the content management system 400 may select the template for the pair (website1.com, q) and then parse the referring URL based on the template to obtain the query information (e.g., keyword(s): sports cars)

At block B545; the content management system 400 may select a content item (e.g., 230) based on the parameter value parsed from the referring URL of the content item request. Thus, for example, the content management system 400 may select a content item based on the keyword(s) "sports cars." At block B550, the content management system 400 may provide the content item for display on the page (e.g., 226A).

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality may be implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable storage media includes both computer storage media and communication media including any medium that facilitates transfer of a computer program from one place to another. A storage media may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable storage media. The computer-readable storage medium does not include a transitory signal.

In various implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-Ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that may be then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method of managing content, the method comprising:
   analyzing a plurality of referring uniform resource locators (URLs) for a same website;
   identifying, from the referring URLs, a given parameter and different parameter values for the given parameter;
   determining that the given parameter is a query parameter for the same website based on a number of the different parameter values for the given parameter meeting a specified threshold number;
   and
   generating a template for parsing a referring URL of the same website based on the determination that the given parameter is a query parameter, wherein the template identifies parameter values for the given parameter in the referring URL of the same website as a query term.

2. The method of claim 1, the method further comprising:
   receiving a content item request for a page, the content item request including a referring URL having website data corresponding to the selected website parameter pair;
   parsing a parameter value from the referring URL of the content item request based on the template for the selected website parameter pair;
   selecting a content item based on the parameter value parsed from the referring URL of the content item request; and
   providing the content item for display on the page.

3. The method of claim 2, wherein the parsing comprises:
   selecting a template for parsing the referring URL of the content item request; and
   parsing a parameter value from the referring URL of the content item request based on the selected template.

4. The method of claim 2, further comprising:
   storing the template for the selected website parameter pair on a server.

5. The method of claim 4, wherein the parsing comprises:
   retrieving the template; and
   parsing a parameter value from the referring URL of the content item request based on the retrieved template.

6. The method of claim 1, wherein the content item comprises an advertisement.

7. The method of claim 1, wherein the parameter value corresponds to at least one keyword.

8. The method of claim 1, wherein the parameter value corresponds to a user input.

9. The method of claim 1, wherein the referring URL of the content item request for the page corresponds to a URL of a previously visited page.

10. The method of claim 9, wherein the referring URL of the content item request for the page corresponds to a user input to the previously visited page.

11. An apparatus for managing content, the apparatus comprising:
    a processor configured for:
    analyzing a plurality of referring uniform resource locators (URLs) for a same website;
    identifying, from the referring URLs, a given parameter and different parameter values for the given parameter;
    determining that the given parameter is a query parameter for the same website based on a number of the different parameter values for the given parameter meeting a specified threshold number;
    and
    generating a template for parsing a referring URL of the same website based on the determination that the given parameter is a query parameter, wherein the template identifies parameter values for the given parameter in the referring URL of the same website as a query term.

12. The apparatus of claim 11, wherein the parameter value corresponds to at least one keyword.

13. The apparatus of claim 11, wherein the parameter value corresponds to a user input.

14. The apparatus of claim 11, wherein the referring URL corresponds to a URL of a previously visited page.

15. A computer program product for managing content, the computer program product comprising:
    a computer-readable storage medium comprising code for:
    analyzing a plurality of referring uniform resource locators (URLs) for a same website;
    identifying, from the referring URLs, a given parameter and different parameter values for the given parameter;
    determining that the given parameter is a query parameter for the same website based on a number of the different parameter values for the given parameter meeting a specified threshold number;
    and
    generating a template for parsing a referring URL of the same website based on the determination that the given parameter is a query parameter, wherein the template identifies parameter values for the given parameter in the referring URL of the same website as a query term.

16. The computer program product of claim 15, wherein the parameter value corresponds to a user input.

17. The computer program product of claim 15, wherein the referring URL corresponds to a URL of a previously visited page.

* * * * *